United States Patent [19]
Van Iderstine et al.

[11] 3,723,722
[45] Mar. 27, 1973

[54] HELICOPTER LIGHTING

[75] Inventors: Theodore J. Van Iderstine, Peabody; Leonard J. Bonnell, Medford, both of Mass.

[73] Assignee: Dyonics, Incorporated, Woburn, Mass.

[22] Filed: Sept. 14, 1970

[21] Appl. No.: 72,010

[52] U.S. Cl. ........................... 240/7.7, 244/17.11
[51] Int. Cl. ........................................ B64d 47/02
[58] Field of Search ....... 240/7.7, 2.1, 10.1, 1 EL, 49; 116/124.4, 129 L; 350/96 B

[56] References Cited

UNITED STATES PATENTS

| | | | |
|---|---|---|---|
| 2,290,278 | 7/1942 | Failla | 116/129 L |
| 3,174,552 | 3/1965 | Soucy, Jr. | 240/7.7 X |
| 2,124,089 | 7/1938 | Stuerzl | 116/129 L |
| 2,333,492 | 11/1943 | Ridge | 240/1 EL |

OTHER PUBLICATIONS

"Concepts of Classical Optics," Strong, 1958, pp. 562-565, QC 355077 C.Z.

Primary Examiner—S. Clement Swisher
Assistant Examiner—Daniel M. Yasich
Attorney—John N. Williams

[57] ABSTRACT

Relatively rotatable elements coupled for light transmission by fiber optic devices analogous to electrical commutators.

A rotary wing aircraft embodiment employing fiber optics in the rotor blade for navigational lights has a flexible light pipe extension from the blade with an end fixed to move with the driving assembly in a set circular path, to sweep by and pick up light from a light source on the body. Other portions of the extension flex to follow cyclic pivoting of the blade relative to its driving assembly. Fibers in the blade are arranged to bend with the blade during operation by use of a flexible light pipe within which the fibers adjust relative to one another during blade bending. Heat-curing of plastic about a heat resistant flexible light pipe and bonding the fibers directly into the blade matrix as bendable strength element using a thin, wide and long ribbon of optical fibers are shown. Light sources on the body of the aircraft are shown as fiber light pipes with ends fixed to be swept by the pickup pipes. Four source light pipes provide light in accordance with navigational rules, a rotor blade receiving alternately white, green, white, red light as it rotates through various sectors. A Maxwellian lens at the end of a source light pipe defines an extended lighted arc along the pickup path, to provide extended duration of light transmission in each sector, the lens also enabling variation in the physical position of the blade assembly as occurs in the field.

27 Claims, 20 Drawing Figures

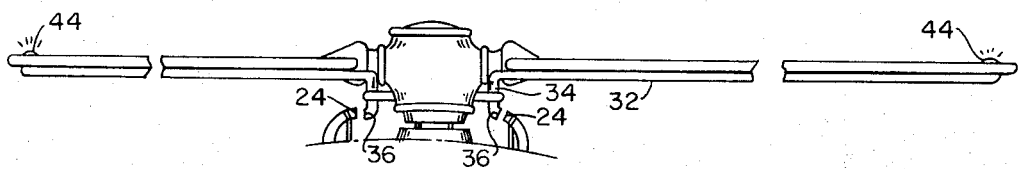
FIG 5
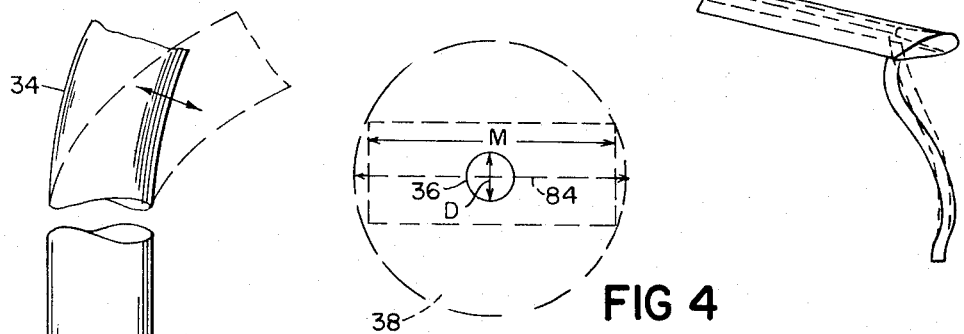
FIG 3
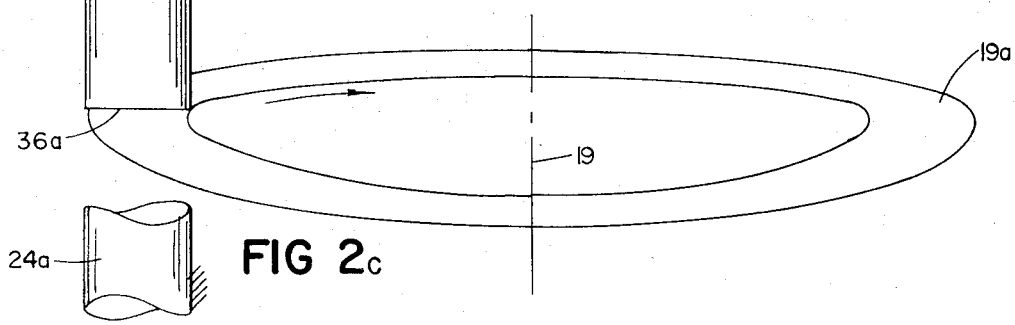
FIG 2d
FIG 4
FIG 2c

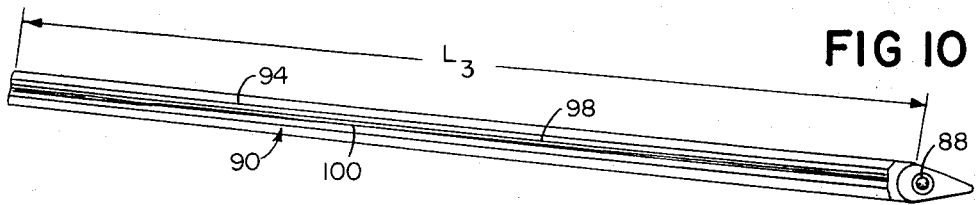
FIG 10
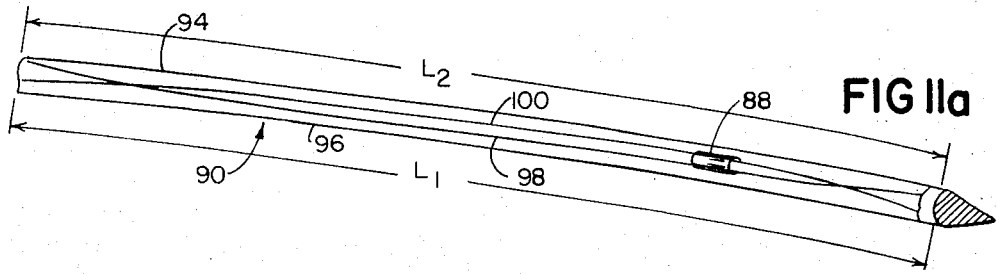
FIG IIa
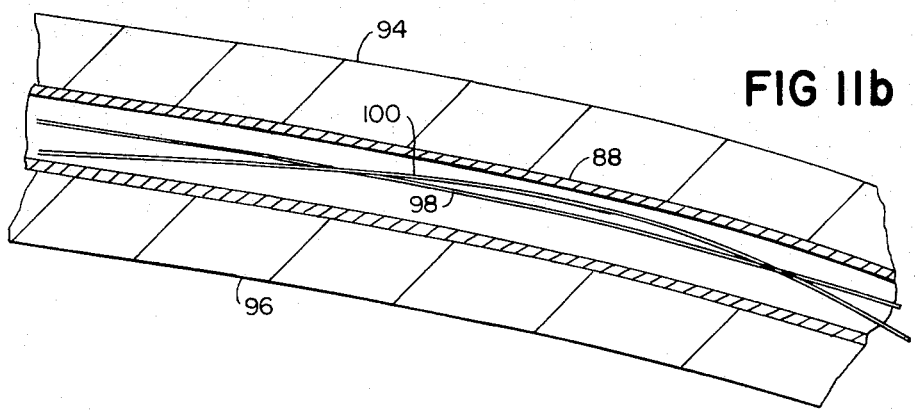
FIG IIb
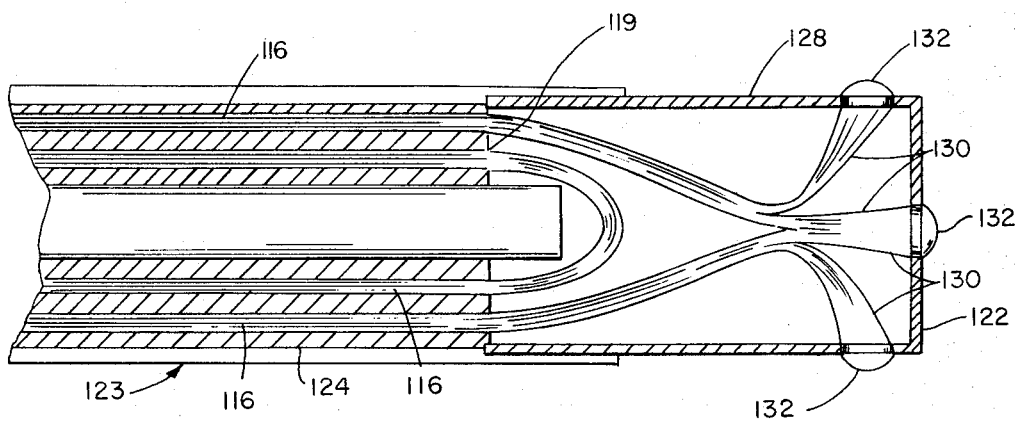
FIG 12

HELICOPTER LIGHTING

This invention relates generally to illumination of rotary elements and in particular to lights on helicopter blades e.g. to provide sector coding, such as providing red and green running lights for blades when on the port and starboard sides of the fuselage, respectively, using fiber optics.

Fiber optics are known and have been suggested by others as substitutes for existing lighting, including use on rotary devices and helicopter blades. Practical application of fiber optics to such rotary devices however encounters numerous and to an extent apparently conflicting problems. It is an object of this invention to resolve these problems and provide practical and improved lighting of rotary members, especially helicopter blades, employing fiber optics.

Among the objects of the invention are to provide apparatus for transmitting light to rotary structures, such as helicopter rotor blades, which are capable of operation: at high speeds—for example, 600 revolutions per minute; under varying conditions of thermal and mechanical stress; with efficient optical coupling; for an extended period of time which exceeds the life of the rotor blades; without creating electrical noise such as sparks; while strengthening the blade structurally; over a range of tolerances between stationary and rotary parts; in a manner which permits simple cleaning and maintenance; providing different color lighting, as determined by blade position, over a substantial portion of each revolution and when desired, without being visible from certain selected directions.

With particular reference to the problem of providing reliable and efficient navigational lighting for helicopter rotor blades, the invention features a set of optic fibers extending along the length of a blade, secured against lengthwise movement and held in a manner to permit their bending transversely to accommodate vertical bending of the blade during operation and a flexible light pipe extension including light conducting fiber portions disposed in a flexible casing and extending from the inboard portion of the blade and in light supplying relationship to the optic fibers. The light pipe extension is mounted to rotate with the blade about the blade drive axis and to flex with repeated cyclic pivoting of the blade about the blade's longitudinal axis and has an end portion adapted to be held in a predetermined position relative to the rotating drive mechanism of the aircraft for describing a predetermined circular path to sweep by and pick up light from a light source on the body of the helicopter.

In preferred embodiments the fibers extending along the length of the blade form a flexible bundle housed in a flexible casing which is disposed within the blade and secured against movement relative thereto; the internal cross-sectional area of the casing exceeds the aggregate cross-sectional area of the fibers of the bundle, providing room for the fibers to adjust themselves relative to one another during bending of the blade during operation; the light pipe extension is defined by an integral extension of the fibers and casing that are within the blade; the optic fibers are glass fibers joined together at their outer ends into a light transmitting end face by heat-resistant bonding material and the casing is a heat-resistant housing and the blade is constructed of aluminum skins permanently secured about the fibers and casing; the optic fibers are embedded directly in a structural matrix defining a portion of the blade and secured in a manner to contribute structural strength to the blade; outboard portions of the fibers protrude beyond the matrix into a housing and end portions of the fibers are bonded together to define an optical light transmitting face; inboard portions of the fibers protrude beyond the matrix and form the optic fiber portions of the light pipe extension; the fibers are secured to each other in the form of a flat ribbon bonded to other structural portions of the blade, the ribbon extending in the direction of length of the blade with its width-wise direction extending in the direction between the leading and trailing edges of the blade and the direction of its thickness aligned with the direction of operational blade bend; and, a plurality of ribbons may be included as structural members of the blade.

With reference to the particular problem of providing the effective transmission of light between rotary and movable and stationary parts, the invention features the combination of two assemblies, one movable relative to the other, and means for transmitting light from a source through both assemblies. This means includes first and second fiber optic light pipes, each having input and output end surfaces, and one light pipe is associated with each assembly. The input end surface of the first light pipe is arranged to receive light from the source, the output end surface of the first light pipe defines an object plane, the input end surface of the second light pipe defines an image plane and the output end surface of the second light pipe is arranged to deliver the transmitted light. The end surfaces defining the object plane and the image plane are spaced apart and relatively movable between at least one position in which they are disposed in light transmitting alignment and at least one position in which they are out of light transmitting alignment and the combination also includes structure disposed between the image and object planes and including a lens assembly with a lens which is spaced apart from one of the end surfaces defining one of the planes and arranged to effectively focus light between the object plane and the image plane when the planes are in the light transmitting alignment. In preferred embodiments the lens is arranged to provide a light image having a depth of field sufficient to permit variations in tolerance of the relative positioning of the output end surface of the first light pipe and the input end surface of the second light pipe without loss of the transmission of light from the source to the output end surface of the second light pipe; the lens assembly has two lenses and is a Maxwellian field lens assembly; the lens assembly is arranged to be adjusted to conform to the actual spacing between the output end surface of the first light pipe and input end surface of the second light pipe after the assemblies have been assembled initially and thereby to effectively transmit light from the output end surface of the first light pipe to the input end surface of the second light pipe; the lens assembly is arranged to focus, in the direction of the image plane, light from the object plane over a region having a minimum dimension, in the direction of relative movement, which is substantially greater than the corresponding dimension of the input end surface of the second light pipe and the light transmitting alignment occurs when any portion of the region and the input end surface of the second light pipe are aligned.

Other objects, features and advantages will become apparent from the abstract and from the following description of a preferred embodiment of the invention, taken together with the attached drawings thereof, in which:

FIGS. 2c and 2d are schematic views of the coupling assembly;

FIG. 3 is a detailed view in cross-section of the optical coupling assembly shown in FIG. 1;

FIG. 4 is a sectional view, taken along line 4—4 of FIG. 3, showing the end surface of a typical rotating light pipe and the image plane projected thereon by the lens assembly;

FIG. 5 is a side elevation of an alternate embodiment of the optical coupling of the invention;

FIG. 10 is a diagrammatic representation, showing two optic fibers, of a portion of a rotor blade in an unstressed condition;

FIG. 11a is a diagrammatic representation of the same portion of the rotor blade after it has been deformed;

FIG. 11b is an enlarged view of a portion of the rotor blade shown in FIG. 11a;

FIG. 12 is a cross-sectional view of an alternate embodiment of the outboard end of a rotor blade;

Figure 1:
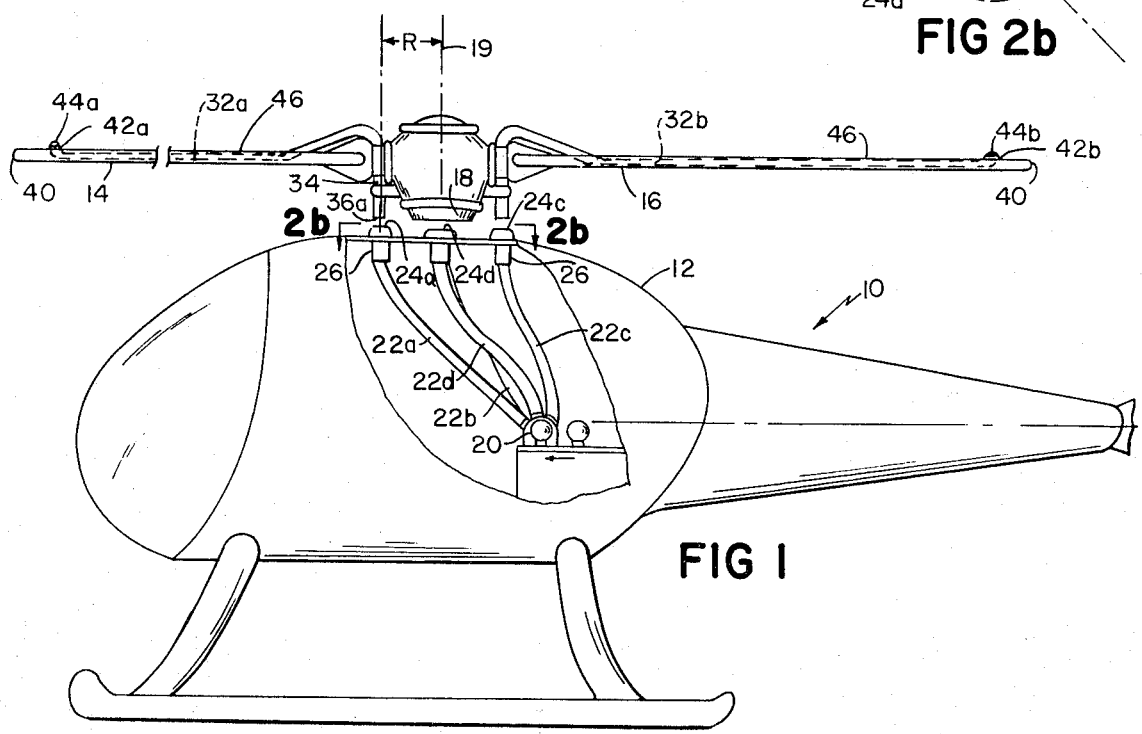
FIG. 1 is a partially diagrammatic view in side elevation of a helicopter incorporating the lighting system of the invention.

Referring to FIGS. 1 and 2, there is shown a helicopter 10 having a cabin or body 12 with longitudinal axis 11 and being arranged to be propelled vertically by rotor blades 14 and 16 which are rotatably mounted on a vertical drive shaft 18 driven by the helicopter motor (not shown), the shaft having axis 19. As is well known in the helicopter industry, suitably adjustable connectors are also provided between shaft 18 and rotor blades 14 and 16 and are arranged to pivot the blades about their longitudinal axes to permit control of the pitch of rotor blades 14 and 16 as they rotate around shaft 18.

The body 12 of helicopter 10 is provided with at least one suitable lamp 20, and a plurality of fiber optic light pipes 22a, b, c, and d, respectively, having smooth polished end surfaces 24a, b, c, d, defining object planes (to be discussed below) these end surfaces being fixed relative to the body 12 of the helicopter. Each light pipe 22 is arranged to couple light from lamp 20 to its respective end surface 24, the latter being supported by a cylindrical housing 26 mounted by any suitable means on cabin 12. Surfaces 24a, b, c, d (FIG. 2b) lie on the circumference of a circle 28 of radius R which is concentric about the axis 19. Through the use of appropriate filters (not shown) white light is coupled to surfaces 24a and 24c, red light is coupled to surface 24d and green light is coupled to surface 24b. Each pipe 22 is provided with a Maxwellian lens assembly 30 (to be discussed in greater detail below) which is arranged to project the light coupled to end surfaces 24 upwardly toward blades 14 and 16. Each of blades 14 and 16 has a fiber optic light pipe 32a and 32b respectively disposed substantially within blades 12 and 14 each with an integral flexible fiber optic extension 34, secured to shaft 18, extending downwardly to an end surface 36 which is fixed relative to drive shaft 18 and defines an image plane 38 (to be discussed below) located a distance R from axis 19. Advantageously, light pipes 32a, 32b are threaded through and secured by any suitable means to an aluminum extrusion rotor blade frame with epoxy and fiberglass applied thereabout, aluminum skins are epoxied about the frame, and the blade is cured in an oven with the light pipe in place. Fiber optic pipes 32a and 32b are turned upwardly near the outboard ends or tips 40 of blades 14 and 16, respectively have upper end surfaces 42a and 42b, adjacent Fresnel lenses 44a and 44b mounted in the top surface 46 of blades 14 and 16, and are arranged to couple light projected onto surfaces 36 to upper surfaces 42a and 42b for display through lenses 44a and 44b respectively.

It will be seen, referring to FIG. 2c, that the interaction of the respective end surfaces 24 and 36 are somewhat analagous to an electrical commutator. Here only one end surface 24a is shown, fixed to the helicopter body 12 and only one end surface 36a is shown, movable about axis 19. Light from the stationary element 24a is transmitted over an air gap to rotary element 36a which repeatedly sweeps past it along path 19a. The blade cyclically pivots about its own axis (FIG. 2d), thus moving relative to surface 36a, however upper parts of extension 34 flex as suggested in FIGS. 2c and 2d, to accommodate this pivoting, the end of the rotor blade being thus maintained in light transmitting continuity with surface 36a.

Referring now to FIG. 3, a typical Maxwellian lens 30 and its relationship to typical light pipe 22 and flexible fiber optic light pipe extension 34 is shown in detail. Light pipes 22 and 34 respectively have hose coverings 50 and 52, preferably constructed of stainless steel interlocked flexible metal, disposed around glass optic fiber bundles 54 and 56, respectively, which terminate in the highly polished end surfaces 24 and 36 respectively. Tubular housing 26 is secured around covering 50, extends beyond surface 24 and has internal threads 58 arranged to accept Maxwellian lens assembly 30. Assembly 30 includes tubular housing 60 which is arranged to be accepted by threads 58 and a spanner slot 62 for adjustment of assembly 30 in threads 58. It supports simple lenses 64 and 66, separated by annular spacer 68, and O-ring 70 for sealing the lenses from dust and water, and locking ring 72 for securing lenses 64 and 66, spacer 68 and O-ring 70 in place. Housing 26 is provided with a set screw 74 to lock assembly 30 in place at a desired adjustment.

When bundle 54 transmits light, the light emerges from surface 24 in the form of an exit cone 76. Lens assembly 30 reimages the light and focuses the light uniformly and with a depth of field 77 of approximately one-fourth inch onto surface 36. The mounting of assembly 30 on threads 58 permits adjustment of the lens assembly to provide this depth of field for any separation 78 (between the upper end 80 of housing 26 and surface 36) from 2 inches up to 10 inches.

The end surface 24 of illuminating bundle 54 is defined as the object plane and the image plane 38 is the area where the illumination is uniform. This is located (FIG. 4) at the end surface 36 while its dimension (M) in the direction of relative movement is approximately 8 times larger than the diameter D of end surface 36. This dimension plays an important part in supplying light to the blades for a sufficient time period to provide navigational lights in accordance with navigational regulations.

Figure 2A:
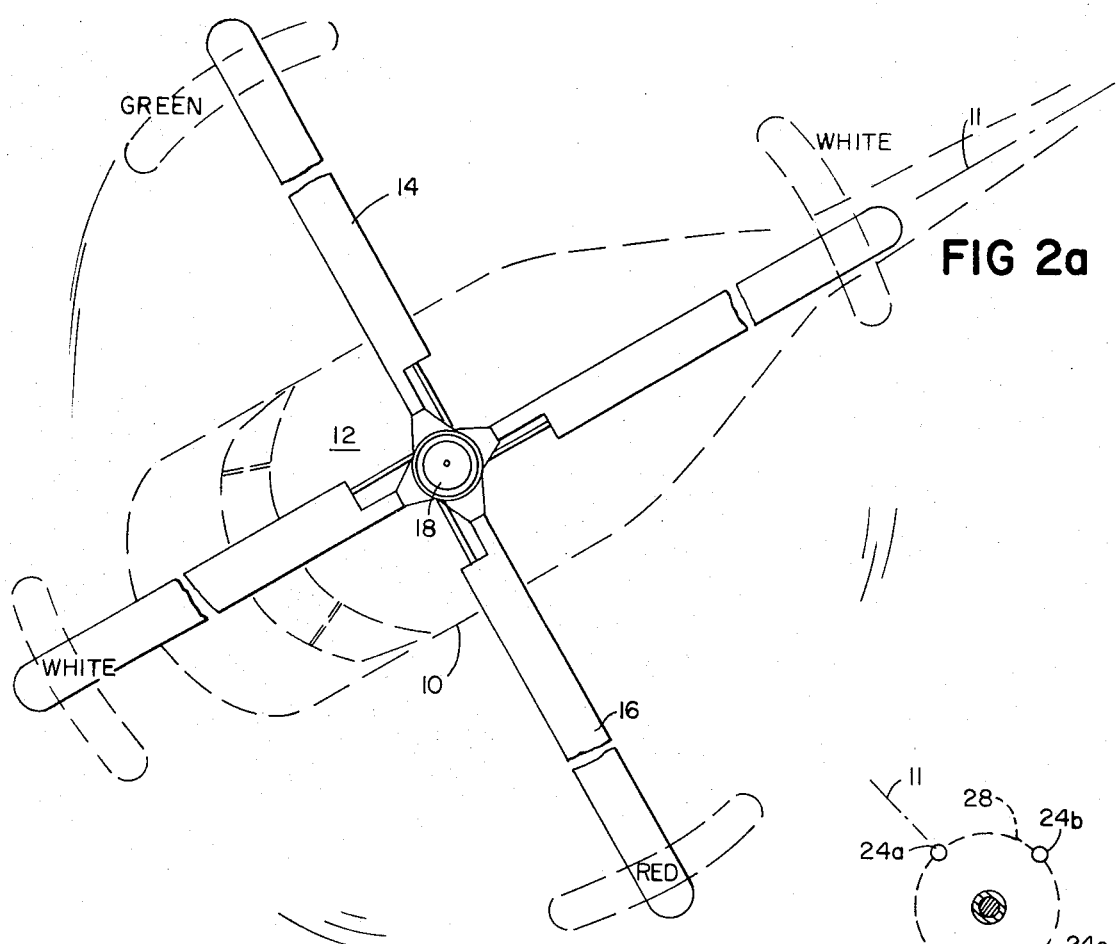
FIG. 2a is a top view of a rotor assembly showing the color pattern to which the navigational lights on the rotor blades must conform during each revolution.
Figure 2B:
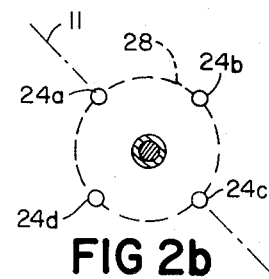
FIG. 2b is a cross-sectional view taken along line 2b—2b of FIG. 1.

To explain this in more detail, the distance from end surface 24 to the aperture of lens assembly 30 is $d_2$, the distance from the exit pupil 82 or aperture of lens assembly 30 to the image plane 38 is $d_1$. As an example of a practical embodiment of this invention, assume that light pipe extension 34 containing bundle 56 comes down along the rotor support shaft so that surface 36 is located 2 inches from the axis 19 of the drive shaft and thus moves in an arc of 2 inch radius from axis 19 during the rotation of the blades 14 and 16. Image plane 38 is of course generated by the object plane (the end surface 24) and the illumination which comes from bundle 22 through end surface 24 has been generated from the light source 20 located at the far end of bundle 54 of light pipe 22 in a suitable location within the cabin 12. This illumination then illuminates the lens assembly 30 which forms a beam of light which is uniform over the area defined as the image plane 38. If the dimensions are chosen so that the focal length of lens assembly 30 is 1.12 inches, end surfaces 24 and 36 are each one-fourth of an inch in diameter, and distance $d_2$ is 1 inch, the image plane 38 will lie a distance $d_1$ of 8 inches beyond the exit pupil 82 of lens assembly 30 and will have a diameter or length 84 of 2 inches in image plane 38. Therefore, as the bundle 56 with its surface 36 in image plane 38 passes along the image plane, illumination will be coupled from end surface 24 to end surface 36 and illuminate a Fresnel lens 44. For the dimensions which have been described, the angular time, "on time," during which single bundle 56 couples illumination from a particular end surface 24 will be approximately 60°. Thus, for a helicopter with two rotor blades, each with a bundle 56, and four bundles 54 mounted on the cabin 12 and spaced 90° apart, the Fresnel lens 44 on each blade will be illuminated four times during each revolution. As is shown in FIG. 2a by filtering the light transmitted from source 20 to end surface 24b and to end surface 24d, white light may be transmitted to lenses 44 at the positions to the front and rear of the cabin, red light at the position to the left of the cabin and green light at the position to the right of the cabin.

For a standard operational speed of rotation of 600 r.p.m. light will be transmitted to each lens 44 at each of the four positions approximately 10 times per second and, therefore, a nearly continuous light will appear to the human eye at each position.

As is well known in the helicopter industry, the distances between moving and stationary parts may vary considerably from the distances when the helicopters are initially assembled at the factory. These variations may be due to mechanical wear or to replacement of parts, often performed under considerable time pressure, in the field. Adjustable lens assembly 30 also accommodates these variations while insuring efficient transmission of light between end surfaces 24 and 36.

As is apparent, orientation of the surfaces 24 and 36 may be varied depending upon the requirements of the particular aircraft. Advantageously, they will be parallel to each other, however, in order to insure maximum efficiency in transmission of light. FIG. 5 shows one alternate embodiment of the invention in which surfaces 24 and 36 are disposed in vertical, rather than horizontal planes.

The light source 20 would normally be located somewhere within or on the cabin ceiling structure of the helicopter. It would be usually most convenient to mount lens assemblies 30 on the ceiling, although it is possible that an extra length of light pipe 22 may be required in order to locate the light source 20 in a lower position than the ceiling in order to achieve proper weight distribution within the vehicle. Light source 20 should be located in such a position that the heat generated by it will not cause any problems with other portions of the vehicle, that is it should not be located directly adjacent to fuel or oil tanks, etc. In addition, it also must be located in such a position as to allow easy change of the lamps. The light pipes 22 should be of such a construction as to resist vibration, but need not be extremely flexible as it is not anticipated that it will be flexed regularly during its lifetime. However, its lifetime is expected to be extended and it must be protected from abuse occurring within the cabin, that is to say mechanical abuse.

Figure 6:
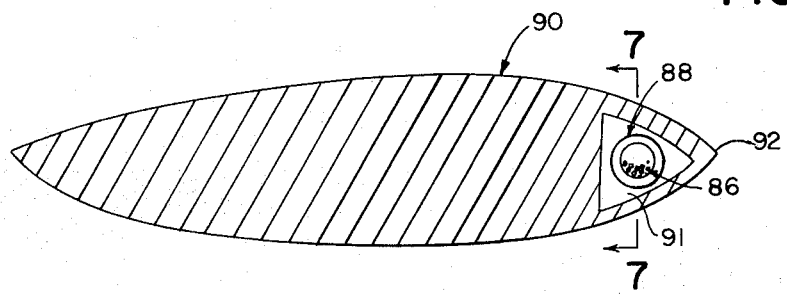
FIG. 6 is a cross-sectional view of a rotor blade.
Figure 7:
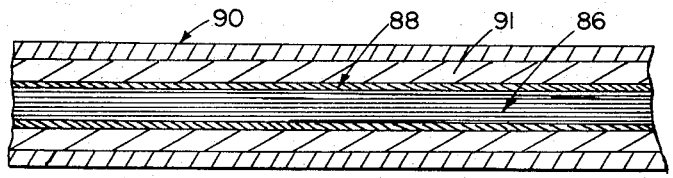
FIG. 7 is a longitudinal view, taken along line 7—7 in FIG. 6 and showing a portion of the fiber optic pipe, of a rotor blade.

According to the invention light pipe extension 34 is extremely flexible, and flexes with the motion of the helicopter blades 14 and 16 in normal flight—a cyclical motion about a longitudinal blade axis to vary the angle of attack with relationship to the helicopter during each circular traverse. A continuation of the flexible light pipe through the length of the blade accommodates bend of the blade along its longitudinal axis (a flapping motion) which occurs at varying times during its operation. According to the invention each bundle allows for these motions through a lifetime projected at approximately 15 to 20 million cycles of blade rotation. The extension 34 is provided with support to remain clear of the mechanism for the rotor blade. According to the invention this may be accomplished in a variety of ways depending upon the particular installation; however, for all configurations the inner end of the extension should be rigidly disposed on the circle 28 (FIG. 2b) in light receiving relation to the illuminating source while the part of the extension between this end and the blade must be free to flex. The portion of the light pipe located within the helicopter blades 14 and 16—that is to say, the portion labelled 32—are, in the preferred embodiment, able to withstand the temperatures of lamination of the blade without deterioration of the covering of the bundle and the fibers in bundle 56 must remain free to move within the bundle covering during flexure of the rotor blade at all times throughout the blade life. With reference to FIGS. 6 and 7, there is shown a typical fiber bundle 86 with its covering 88 in a helicopter rotor blade 90. The outer covering 88 and the bundle 86 are secured to the blade, for example, by the epoxy 91 shown, so that there is no motion of the light pipe with respect to the center of gravity or center of lift of the rotor blade during its operation. The rotor blade which may turn as fast as 600 to 700 r.p.m. develops a considerable centrifugal force at or near the outboard end or tip 92, but the secured light pipe does not change the weight distribution. However, according to the invention the individual glass fibers are not so secured, and flex during flight, adjusting themselves within the open space of the casing, as the helicopter rotor blade 90 flexes along its longitudinal axis. That is to say, the outboard tip 92 moves up and down in a manner similar to the flapping of a bird's wing. This motion is effectively a bending of the blade itself. In addition to the up-and-down motion the blade 90 tends to "fly"—that is, the pitch of the blade is changed by mechanisms to effect flight and the forces caused thereby tend to maintain the tip 92 in a constant attitude so that there is a torsional change in the lay of the blade with time. When tip 92 of the blade moves up and down the blade tends to take on a curved shape (see FIGS. 10, 11a and 11b). This curving causes the outer surface 94 of the blade on the outside of the curve to become longer than the inner surface 96 of the blade on the inside of the curve. The fibers (two typical fibers, designated 98 and 100 are shown) at this same time, then reach a condition in which the path length has increased for the fiber 98 which is nearer the outside surface 96 of the curved blade. By allowing the fibers 98 and 100 to remain free and to move to a limited extent within the covering 88 rather than the curving causing a change in their path length, their position within the covering 88 changes and they tend to maintain their initial length, eliminating fracture from tensile stresses.

As is shown in FIGS. 11a and 11b, when the blade 90 is curved downward sufficiently, fiber 98 (which in the unstressed blade of FIG. 10 was disposed entirely above fiber 100) has moved downwardly and in part is below fiber 100, while fiber 100 has moved up from its initial position. Thus, although the curved length $L_2$ of outside surface 94 is greater than the length $L_1$ of inside surface 96, fibers 98 and 100 have shifted their paths, between the end of the portion of blade 90 shown, to remain substantially at their initial unstressed length $L_3$.

The bundle covering 88 could be held in place by any suitable mechanical means such as retention clips at regular intervals, a moderate soft epoxy or other chemical bonding agent, or a rigid or semi-rigid chemical bonding agent. The particular holding material employed is not important. However, the bundle covering 88 must be a nonrigid material and able to conform to the shape of the blade 90.

Figure 8:
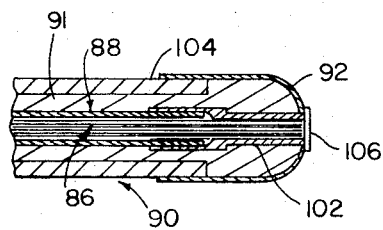
FIG. 8 is a longitudinal view of the outboard end of a rotor blade.

Referring now to FIG. 8 which shows one embodiment of the outboard end termination of a blade using the circular bundle 86 molded into the blade, there is shown a bundle tip 102 which also may be bent up to the top surface 104 of the blade for upshining lights which would not be visible from the ground, bent down for down-viewing light which would not be seen from above, or straight out as shown here and terminating adjacent a Fresnel lens 106 to spread the light over a larger angle, or even may be bifurcated or split into two or more terminations to provide coverage over a wider range.

Figure 9:
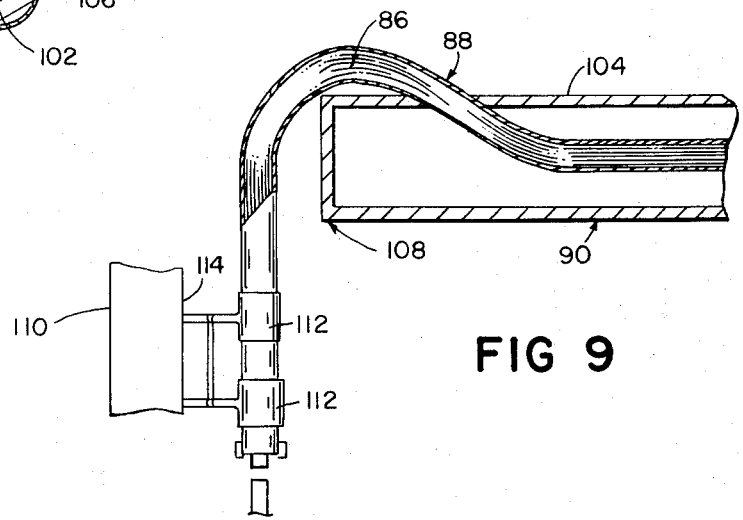
FIG. 9 is a longitudinal view, showing one method of entry of a fiber optic pipe to and within a rotor blade, of the inboard end of a rotor blade.

One method of exiting the blade with the fiber bundle at the inboard end 108 is illustrated in FIG. 9. The bundle 86 is shown brought out of the blade 90 over the top surface 104 and into the region near the rotor support column 110 and is shown supported by clamp rings 112 which in turn are supported by a rotating portion 114 of the rotor mechanism. The bundle 86 exits blade 90 as an integral flexible extension and extends to the image plane as described above.

In another embodiment of the invention (FIGS. 12 through 16) the optic fibers 116 are prepared as ribbons 116 (FIG. 14) of fibers each having a single fiber or a very small number of fibers in thickness, $t$, and a width, $w$, approximating the rotor blade width. The ribbons 116 having individual fibers 117 are coated with a long B state epoxy 118 (normal B state epoxy life is 6 to 9 months). After appropriate placement on the blade body, epoxy 118 is heat-cured and is terminated, at points 119, a sufficient distance from ends 120 to 122 of the blade to permit bundling and generation of the proper orientation of the bundle at both ends of the blade.

Figure 13:
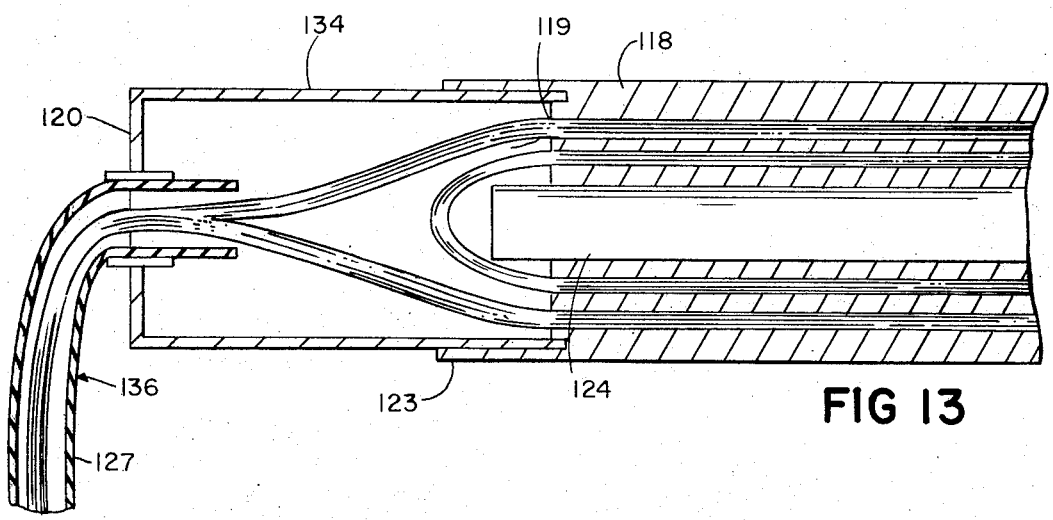
FIG. 13 is a cross-sectional view of the inboard end of the rotor blade of FIG. 12 showing a second method of entry of a fiber optic pipe to and within the rotor blade.
Figure 14:
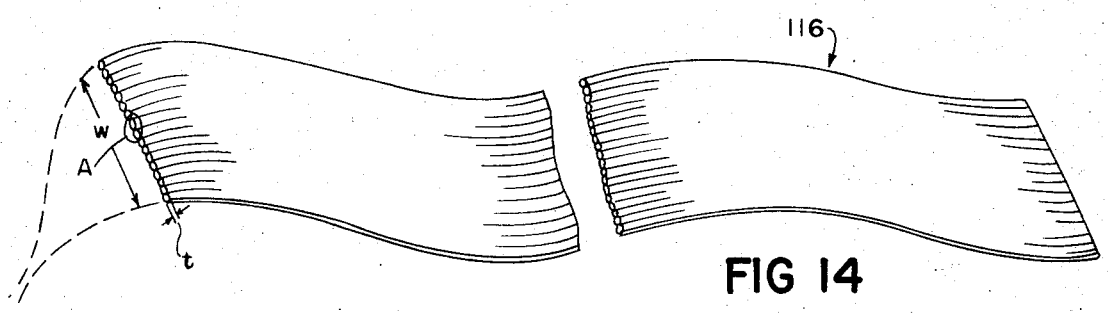
FIG. 14 is a perspective view, partly broken away, of a fiber optic light ribbon.
Figure 15:
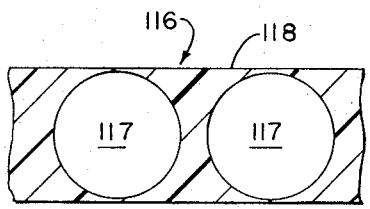
FIG. 15 is an enlarged detailed view of the portion of the ribbon of FIG. 14 circumscribed by circle A.
Figure 16:
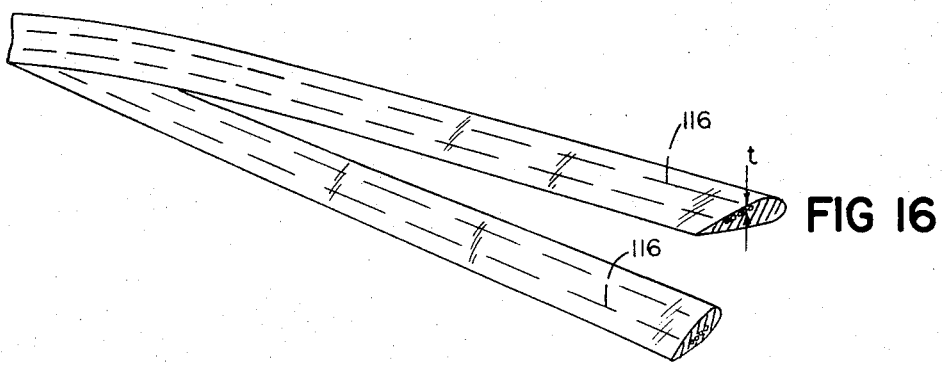
FIG. 16 is a diagrammatic perspective view, partly broken away, of a portion of a rotor blade including a fiber optic light ribbon.

FIG. 12 illustrates the detail of the outboard end 122 of a blade 123. The blade has a core 124 about which the blade is laminated. The layers of ribbons 116 provide basic strength to the blade 123 (for example when blade 123 bends downwardly as shown in FIG. 16) and cover the core 124. The end portions 122 of ribbons 116 extend at point 119 into an open space from the epoxied portion of blade 123. At a position to the right of point 119 in FIG. 12 the light fibers are separated individually (no longer forming a ribbon) and are bunched together as a circular bundle within hollow cap 128. This bundle may be split into one or more bundles 130, for example, into the three separate bundles shown. One of the bundles 130 extends to the top of blade 123, one to the bottom and the third to the outboard end 122. The blade itself is constructed of a heat-cured frame plastic with aluminum secured thereabout with epoxy. Lenses 132 are mounted on blade 123 to direct the light from the bundles 130 to provide coverage in the directions desired. FIG. 13 illustrates the termination at the inner end of the blade. The ribbons 116 are gathered together beginning at point 119 (again, the limit of the epoxy on the ribbon), from there into an inner tip hollow cap 134. A flexible optical bundle extension 136 having, for example, a high strength silicone casing which is impervious to the natural environment and is extremely flexible extends down to the image plane as described above.

As is apparent from the above description, the invention is useful in many other applications than the lighting of helicopter navigational lights.

Numerous other variations in the specific detail will occur to those skilled in the art and are within the spirit and scope of the following claims.

What is claimed is:

1. In a rotor blade for a rotary wing aircraft, said blade including a set of optic fibers extending along the length of said blade for conducting light from an inboard end to an outboard end to provide navigational light, the improvement wherein said fibers are secured against lengthwise movement along said blade and are held in a manner permitting their bending to accommodate vertical bending of said blade during operation, and a flexible light pipe extension extends from an inboard portion of said blade and in light supplying relation to said optic fibers, said light pipe extension comprising light conducting fiber portions disposed within a flexible casing portion, and being mounted to rotate with said blade about the blade drive axis and adapted to flex with repeated cyclic pivoting of said blade about the latter's longitudinal axis, said flexible light pipe extension having an end portion adapted to be held in a predetermined position relative to the rotating drive mechanism of the aircraft for describing a predetermined circular path to sweep by and pick up light from a light source on the body of said aircraft.

2. The rotor blade of claim 1 wherein said fibers extending along the length of said blade comprise a flexible bundle housed in a flexible casing, said casing being disposed within said blade and secured against movement relative thereto, the internal cross-sectional area of said casing exceeding the aggregate cross-sectional area of said fibers of said bundle, thereby providing room for said fibers to adjust themselves relative to one another during bending of said blade during operation.

3. The rotor blade of claim 2 wherein said light pipe extension extending from the inboard portion of said blade is defined by an integral extension of said fibers and casing that are within said blade.

4. The rotor blade of claim 2 wherein said optic fibers are glass fibers joined together at their outer ends into a light transmitting end surface by heat-resistant bonding material, said casing comprises a heat-resistant housing, and said blade comprises heat-cured structure permanently secured about said casing.

5. The rotor blade of claim 1 wherein said optic fibers are embedded directly in a structural matrix defining a portion of said blade.

6. The rotor blade of claim 5 wherein said optic fibers are glass and are secured in a manner to contribute structural strength to said blade.

7. The rotor blade of claim 5 wherein outboard portions of said fibers protrude beyond said matrix into a housing, and end portions of said fibers are bonded together to define a light transmitting face.

8. The rotor blade of claim 5 wherein inboard portions of said fibers protrude beyond said matrix, forming the optic fiber portions of said light pipe extension.

9. The rotor blade of claim 1 wherein said fibers are secured to each other in the form of a substantially flat ribbon, said ribbon being bonded to other structural portions of said blade extending in the direction of the length of said blade, with its widthwise direction extending in the direction between the leading and trailing edges of said blade and the direction of its thickness aligned with the direction of operational blade bend.

10. The rotor blade of claim 9 wherein a plurality of said ribbons comprise structural members of said blade.

11. An aircraft including the rotor blade of claim 1 mounted on a rotating driving mechanism defining said drive axis, and a control assembly for cyclic pivoting of said blade to alter its angle of attack, the end of said light pipe extension being secured to the rotary portion of said driving mechanism and adapted to describe a predetermined circular path relative to the body of the aircraft, and at least one light source mounted on the body of the aircraft, said light source being disposed to focus light on a portion of said circular path of said light pipe end.

12. The aircraft of claim 11 wherein said light source includes a lens providing a depth of focus which permits variation in tolerance of the relative positioning of said blade and said body of said aircraft.

13. The aircraft of claim 11 wherein said light source is defined by at least one fiber optic light pipe mounted on said body of said aircraft, said fiber optic light pipe having a light-output end surface positioned to transmit a point on said circular path.

14. In combination a rotor blade for a rotary wing aircraft having disposed in the body thereof a lamp, said blade having disposed thereon an element arranged to transmit light and means for supplying light from the inboard end of said blade to said element, structure defining two assemblies, one movable relative to the other, and including first and second fiberoptic light pipes associated respectively with each assembly, the input end surface of said first light pipe being arranged to receive light from said lamp, the output end surface of said first light pipe defining an object plane, the input end surface of said second light pipe defining an image plane and the output end surface of said second light pipe being arranged to deliver the transmitted light to said element, the end surfaces defining said object plane and said image plane being spaced apart and relatively movable between at least one position in which they are disposed in light transmitting alignment and at least one position in which they are out of light transmitting alignment, and focusing structure disposed between said image and object planes and comprising a lens assembly including a lens, said lens assembly being spaced apart from one of said end surfaces defining one of said planes, and said lens being arranged to effectively focus light between said object plane and said image plane when said planes are in said light transmitting alignment.

15. The combination of claim 14 wherein said lens assembly is arranged to focus, in the direction of said image plane, light from said object plane over a region having a minimum dimension, in the direction of relative movement, which is substantially greater than the corresponding dimension of said input end surface of said second light pipe, said light transmitting alignment occurring when any portion of said region and said input end surface of said second light pipe are aligned.

16. The combination of claim 15 wherein one of said two relatively movable members is a rotary member arranged to rotate relative to the other of said relatively movable members and the said output end surface of said second light pipe, when light is transmitted thereto, is arranged to provide a navigational light, the ratio of the magnitude of said minimum dimension of said region to the perimeter of said rotatably movable member thereby determining the portion of each revolution of said rotary member during which said navigational light is energized.

17. A navigational lighting system for rotary wing aircraft, said lighting system comprising an optic assembly including optic fibers extending along the length of each blade for conducting light from the inboard end to the outboard end thereof, an inner portion of the assembly for each blade adapted to be held in a respective predetermined position relative to the central rotating mechanism of the aircraft, spaced from the axis thereof for describing a predetermined circular path, and a light source mounted on the body of the aircraft illuminating a sector of said circular path, for directing light into said fiber optic assembly, thence to the outer end of said assembly to provide a navigational light.

18. The navigational lighting system of claim 17 wherein there are a plurality of light sources mounted on the body of said aircraft, each illuminating a different sector of said circular path.

19. The navigational lighting system of claim 18 wherein there are two light sources, one red, the other green, associated respectively with the left and right sides of the circular path relative to the aircraft.

20. The navigational lighting system of claim 18 wherein said plurality of light sources comprise a plurality of fiber light pipes, the output ends thereof associated with different sectors of said circular path, the input ends thereof associated with a common lamp.

21. The navigational lighting system of claim 17 wherein the circular path for all of said blades are coincident.

22. The lighting system of claim 17 in which said light source comprises the combination of a lamp, a fiber optic light pipe conducting light from the lamp to an output end surface, and a lens assembly arranged to focus the object of said end surface upon an image plane coincident with said path.

23. The combination of claim 22 wherein said lens assembly is arranged to provide a light image having a depth of field sufficient to permit variations in tolerance of the relative positioning of the output end surface of said light pipe and the inboard end of said optic assembly without loss of effective transmission of light from said source to said assembly.

24. The combination of claim 23 wherein said lens assembly has two lenses and is a Maxwellian field lens assembly.

25. The combination of claim 22 wherein the spacing between said output end surface of said light pipe and said inboard end of said optic assembly is adapted to be one of a plurality of possible spacings and is determined by the installation of said combination and said lens assembly is arranged to be adjusted to conform to said actual spacing and thereby to effectively transmit light from said output end surface of said first light pipe to said inboard end of said optic assembly when said actual spacing is any of said plurality of possible spacings.

26. The combination of claim 22 wherein said lens assembly is arranged to focus, in the direction of said image plane, light from said object over a region having a dimension, in the direction of circular movement of said blade which is substantially greater than the corresponding dimension of said inboard end of said optic assembly, light transmitting alignment occurring when any portion of said region and said inboard end are aligned.

27. The combination of claim 26 wherein the ratio of the magnitude of said dimension of said region to the perimeter of said circular path, determining the portion of each revolution of said rotary member during which said light is transmitted is established according to aircraft navigational rules.

* * * * *